(12) United States Patent
Hutchinson et al.

(10) Patent No.: US 11,275,029 B2
(45) Date of Patent: Mar. 15, 2022

(54) CONTROLLED SEPARATION OF LASER ABLATION SAMPLE GAS FOR DIRECTION TO MULTIPLE ANALYTIC DETECTORS

(71) Applicant: Elemental Scientific Lasers, LLC, Omaha, NE (US)

(72) Inventors: Robert W. Hutchinson, Sheffield (GB); David N. Douglas, Plymouth (GB)

(73) Assignee: ELEMENTAL SCIENTIFIC LASERS, LLC, Omaha, NE (US)

(*) Notice: Subject to any disclaimer, the term of this patent is extended or adjusted under 35 U.S.C. 154(b) by 0 days.

(21) Appl. No.: 16/706,197

(22) Filed: Dec. 6, 2019

(65) Prior Publication Data
US 2020/0182796 A1 Jun. 11, 2020

Related U.S. Application Data

(60) Provisional application No. 62/776,669, filed on Dec. 7, 2018.

(51) Int. Cl.
*G01N 21/71* (2006.01)
*B23K 26/40* (2014.01)
*G01J 3/443* (2006.01)

(52) U.S. Cl.
CPC .......... *G01N 21/718* (2013.01); *B23K 26/40* (2013.01); *G01J 3/443* (2013.01); *G01N 2201/06113* (2013.01)

(58) Field of Classification Search
CPC ....... G01N 21/718; G01N 2201/06113; B23K 26/40; G01J 3/443
(Continued)

(56) References Cited

U.S. PATENT DOCUMENTS 8,598,521 B2 * 12/2013 Levis .................... H01J 49/165
250/288
8,879,064 B2 11/2014 O'Connor et al.
(Continued)

FOREIGN PATENT DOCUMENTS

JP 2013024806 A 2/2013

OTHER PUBLICATIONS

Anonymous, "Inductively coupled plasma mass spectrometry," Wikipedia, XP055681204, Dec. 5, 2018 (Retrieved from the Internet: URL:https://en.wikipedia.org/w/index.php?title=Insuctively_coupled_plasma_mass_spectrometry&oldid=872209119 [retrieved on Mar. 31, 2020] 8 pages.

(Continued)

*Primary Examiner* — Roy M Punnoose
(74) *Attorney, Agent, or Firm* — Kevin E. West; Advent, LLP

(57) ABSTRACT

A laser-ablation-based analytical system can include a sample chamber input, a make-up gas input, a vacuum pump, and an output flow. The sample chamber input can be configured to deliver a sample chamber gas flow comprised of combination of a laser-ablated sample and a sample-carrier gas from a sample chamber. The make-up gas input can be configured to provide an amount of make-up gas to supplement the combination of the laser-ablated sample and the sample-carrier gas. The vacuum pump can be fluidly connected to the sample chamber input and the make-up gas input, the vacuum pump configured to create a negative pressure in a sample transport gas downstream of the vacuum pump, the sample transport gas including the make-up gas, the laser-ablated sample, and the sample-carrier gas. The output flow can be configured to deliver the sample transport gas from the vacuum pump to a detection device.

17 Claims, 2 Drawing Sheets

(58) Field of Classification Search
USPC .......................................................... 356/318
See application file for complete search history.

(56) References Cited

U.S. PATENT DOCUMENTS

| | | | |
|---|---|---|---|
| 9,524,856 B2 | 12/2016 | Hilliard et al. | |
| 10,211,038 B2* | 2/2019 | Nagata | H01J 49/105 |
| 2010/0252731 A1 | 10/2010 | Reilly | |
| 2011/0133074 A1 | 6/2011 | Nakanishi et al. | |
| 2011/0210241 A1* | 9/2011 | Badiei | H01J 49/24 |
| | | | 250/282 |
| 2012/0149009 A1* | 6/2012 | Levis | H01J 49/165 |
| | | | 435/5 |
| 2015/0357173 A1* | 12/2015 | Koeppen | H01J 49/0463 |
| | | | 250/282 |
| 2016/0111270 A1* | 4/2016 | Chapon | H01J 37/32862 |
| | | | 250/282 |
| 2017/0221688 A1* | 8/2017 | Nagata | H01J 49/0422 |
| 2018/0047551 A1 | 2/2018 | Jones et al. | |

OTHER PUBLICATIONS

Craig, G. et al., "Laser ablation split stream (LASS) between three ICP-MS for zircon petrochronology," ThremoFisher Scientific, Technical Note 30415, 2017, 7 pages.
International Search Report and Written Opinion for PCT/IB2019/001310, dated Apr. 14, 2020.

* cited by examiner

CONTROLLED SEPARATION OF LASER ABLATION SAMPLE GAS FOR DIRECTION TO MULTIPLE ANALYTIC DETECTORS

CROSS-REFERENCE TO RELATED APPLICATIONS

The present application claims the benefit under 35 U.S.C. § 119(e) of U.S. Provisional Application Ser. No. 62/776,669, filed Dec. 7, 2018, and titled "CONTROLLED SEPARATION OF LASER ABLATION SAMPLE GAS FOR DIRECTION TO MULTIPLE ANALYTIC DETECTORS." U.S. Provisional Application Ser. No. 62/776,669 is herein incorporated by reference in its entirety.

BACKGROUND

Laser ablation Inductively Coupled Plasma Mass Spectrometry (LA-ICP-MS) or Laser ablation Inductively Coupled Plasma Optical Emission Spectrometry (LA-ICP-OES) techniques can be used to analyze the composition of a target (e.g., a solid or liquid target material). Often, a sample of the target is provided to an analysis system in the form of an aerosol (i.e., a suspension of solid and possibly liquid particles and/or vapor in a carrier gas, such as helium gas). The sample is typically produced by arranging the target within a laser ablation chamber, introducing a flow of a carrier gas within the chamber, and ablating a portion of the target with one or more laser pulses to generate a plume containing particles and/or vapor ejected or otherwise generated from the target (hereinafter referred to as "target material"), suspended within the carrier gas. Entrained within the flowing carrier gas, the target material is transported to an analysis system via a transport conduit to an ICP torch where it is ionized. A plasma containing the ionized particles and/or vapor is then analyzed by an analysis system, such as an MS, OES, isotope ratio mass spectrometry (IRMS), or electro-spray ionization (ESI) system.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner.

Aspects of the disclosure relate to a laser-ablation-based analytical system. The laser-ablation-based analytical system can include a sample chamber input, a make-up gas input, a vacuum pump, and an output flow. The sample chamber input can be configured to deliver a sample chamber gas flow comprised of combination of a laser-ablated sample and a sample-carrier gas from a sample chamber. The make-up gas input can be configured to provide an amount of make-up gas to supplement the combination of the laser-ablated sample and the sample-carrier gas. The vacuum pump can be fluidly connected to the sample chamber input and the make-up gas input, the vacuum pump configured to create a negative pressure in a sample transport gas downstream of the sample chamber input, a made-up sample transport gas including the make-up gas, the laser-ablated sample, and the sample-carrier gas, upon mixing at the vacuum pump. The output flow can be configured to deliver the made-up sample transport gas from the vacuum pump to a detection device.

DRAWINGS

The Detailed Description is described with reference to the accompanying figures.

DETAILED DESCRIPTION

Overview

In accordance with example embodiments of the present disclosure, vacuum pumps can be used to create gas negative or reduced pressure in the sample transport gas downstream from a laser ablation sample chamber either before the laser ablation sample chamber, in the laser ablation sample chamber, or after the laser ablation sample chamber. In an embodiment, the vacuum pumps may be in the form of vacuum jet pumps (also called Venturi pumps or vacuum ejectors). The flow of sample transport gas can also be split into two or more streams by using two or more such vacuum devices for the purposes of analyzing the ablated material on two or more detections systems (e.g., ICP-MS, ICP-OES, IRMS, ESI). Examples of laser-ablation-based analysis systems with a sample-generation chamber and a fluidly coupled analysis device can be found in U.S. Pat. Nos. 8,879,064 and 9,524,856, the contents of which are hereby incorporated by reference.

Example Embodiments

Figure 1:
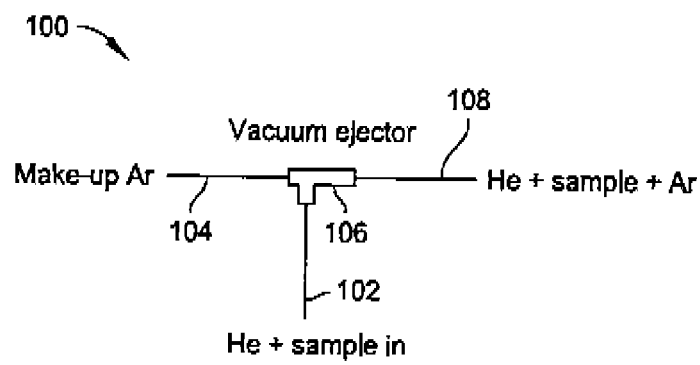
FIG. 1 is a schematic view of a vacuum ejector used to mix a sample chamber gas flow with a make-up flow of argon, according to an example embodiment of the present disclosure.

FIG. 1 illustrates a laser-ablation-based analytical system 100, according to an example embodiment of the present disclosure. The laser-ablation-based analytical system 100 includes a sample chamber input 102, a make-up carrier gas (e.g., argon (Ar)) input 104, a vacuum pump 106 (e.g., illustrated in the form of a vacuum ejector), and an output flow 108 for analysis (e.g., analysis by detection system such as ICP-OES/ICP-MS). The sample chamber input 102 is configured to deliver a sample chamber gas flow comprised of a combination of a sample-carrier gas (e.g., helium (He)) and a laser-ablated sample from a sample chamber (not shown). The make-up Ar input 104 is configured to provide an amount of Ar, for example in this instance, from the system (e.g., ICP-MS), as needed, to provide a necessary total amount of gas carrier (i.e., make-up for any gas-level shortfall) in the output flow 108 for analysis thereof. In an embodiment, the initial amount of gas flow associated with the sample chamber gas flow from the sample chamber input 102 can be insufficient for analysis, the amount of make-up gas (e.g., Ar) added thereto at the vacuum pump 106 being enough to render amount (e.g., mass or volume) of the made-up sample transport gas appropriate (e.g., sufficient or adequate) for analysis.

The vacuum pump 106 can be used to create gas negative or reduced pressure in the sample transport gas downstream from a laser ablation sample chamber either before the laser ablation sample chamber, in the laser ablation sample chamber, or after the laser ablation sample chamber (i.e., creating a negative flow pressure upstream of the vacuum pump 106). In an embodiment, the pressure difference created by the vacuum pump 106 can pull or otherwise suction the sample gas flow from the sample chamber input 102 and through the vacuum pump 106, thereby promoting flow thereof toward the output flow 108. The vacuum pump 106 is further configured to mix the sample chamber input gas flow of the sample chamber input 102 with the make-up flow provided by the make-up Ar input 104 to yield a mixed or made-up sample transport gas.

In the application illustrated in FIG. 1, a single pump (e.g., vacuum pump 106) can be used to mix the sample chamber gas flow (e.g., Ar, He, N2, air, methane, oxygen, or any other gas or mixture of gases) with a carrier flow or driving gas from a mass flow controller (not shown in this embodiment). In an embodiment, the output flow 108 can deliver the made-up sample transport gas, that is the flow including the make-up gas and the combination of the laser-ablated sample and the sample-carrier gas, from the vacuum pump 106 to the appropriate detection device (not shown). In an embodiment, the vacuum pump 106 can be a vacuum ejector, which is a term of art that can be interchangeable with "jet pump" or "jet ejector." A vacuum ejector, unlike a diaphragm pump, does not create pressure waves that can yield oscillation in the resulting signal.

Figure 2:
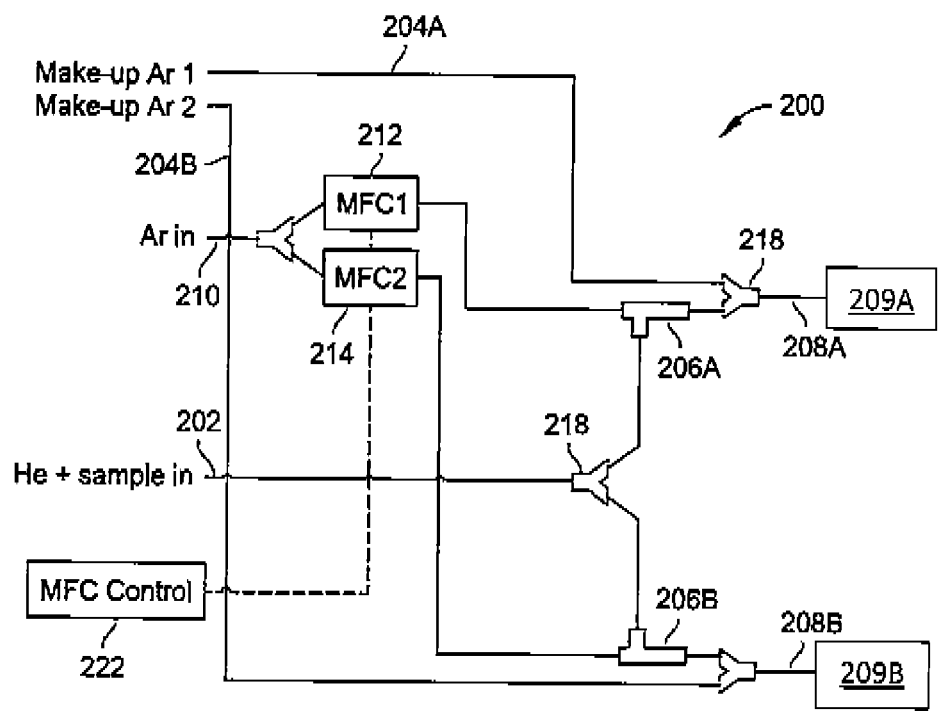
FIG. 2 is a schematic view of a laser-ablation-based analytical system, including a device using vacuum ejectors independently driven by two respective mass flow controllers (MFCs) to split the sample chamber gas flow to be delivered to two detector devices, according to an example embodiment of the present disclosure.

FIG. 2 illustrates a laser-ablation-based analytical system 200, according to an example embodiment of the present disclosure. The laser-ablation-based analytical system 200 can include a sample chamber input 202, a pair of make-up argon (Ar) inputs 204a, 204b, a pair of vacuum pumps 206a, 206b (e.g., in the form of vacuum ejectors), a pair of output flows 208a, 208b for analysis (e.g., analysis by a detection system (not shown) such as ICP-OES/ICP-MS), a primary Ar input 210 (e.g., from an Ar cylinder source), a first mass flow controller (MFC1) 212, a second mass flow controller (MFC2) 214, a plurality of three-way (e.g., Y-shaped or T-shaped) connectors 218 (e.g., acting as a flow splitter or a flow consolidator, depending on orientation), and a control system (e.g., a MFC control 222), along with a plurality of fluid interconnections, as needed (not labelled).

In the embodiment of FIG. 2, the primary Ar input 210 can be fluidly connected with the MFC1 212 and the MFC2 214 via one of the three-way connectors 218, where that three-way connector 218 can be configured as a flow splitter. The MFC1 212 can be configured to fluidly output to the vacuum pump 206a, and the MFC2 212 can be configured to fluidly output to the vacuum pump 206b. In an embodiment, a mass flow controller (e.g., MFC1 212, MFC2 214) can be a device used to measure and control a flow of fluid therethrough. In an embodiment, a mass flow controller (e.g., MFC1 212, MFC2 214) can include a MFC inlet, a MFC outlet, a mass flow sensor, and a control valve (such subcomponents either not labelled or not shown). In an embodiment, the MFC1 212 and the MFC2 214 can be configured to regulate the amount of the sample chamber gas flow is permitted to flow toward (e.g., be suctioned into) the vacuum pump 206a and the vacuum pump 206b, respectively. The sample chamber input 202 (e.g., configured to deliver a sample chamber gas flow) can be fluidly connected to the vacuum pumps 206a, 206b via one of the three-way connectors 218, where that three-way connector 218 can be configured as a flow splitter.

In an embodiment, the primary Ar input 210 (i.e., a first added carrier gas) can be fluidly connected to a given vacuum pump 206a, 206b (e.g., via MFC1 212, MFC2 214, respectively) to yield a given first sample transport gas and a corresponding second carrier gas serving as the corresponding make-up gas flow (e.g., first or second make-up Ar input 204a, 204b) is added thereto after the given vacuum pump 206a, 206b to arrive at the necessary fluid amount (e.g., mass (kilograms/hour) or volume (liters/hour)) for the given output flow 208a, 208b. The vacuum pump 206a can be configured to fluidly input to the first output flow 208a, via one of the three-way connectors 218 (oriented as a flow consolidator), mixing with any make-up Ar provided by the first make-up Ar input 204a (connected to the first output flow 208a by the same three-way connector 218 as the vacuum pump 206a). The first make-up Ar input 204a may, for example, be configured to receive make-up Ar from the first detector (e.g., ICP-MS 1) (not shown). Similarly, the vacuum pump 206b can be configured to fluidly input to the second output flow 208b, via one of the three-way connectors 218 (oriented as a flow consolidator), mixing with any make-up Ar provided by the second make-up Ar input 204b (connected to the second output flow 208b by the same three-way connector 218) to yield a given made-up sample transport gas. The second make-up Ar input 204a may, for example, be configured to receive make-up Ar from the second detector (e.g., ICP-MS 2) (not shown). MFC1 212 and/or the MFC2 214 may include an embedded flow sensor (not shown) to aid in the control and/or monitoring of flow therethrough. The MFC coms port 222 can be communicatively linked with each of the MFC1 212 and the MFC2 214 to facilitate the respective flow control through each. Alternatively, MFC1 212 and/or the MFC2 214 may permit manual control thereof (e.g., power outage, emergency shut-off, etc.).

As seen from the embodiment of FIG. 2, the gas flow from the sample chamber input 202 can be split into two or more streams with the aid of a pair of mass flow controllers (e.g., MFC1 212 and MFC2 214) and the respective jet pumps/ejectors (e.g., vacuum pumps 206a, 206b). In an embodiment, the vacuum pressure, particularly that upstream of the respective vacuum pumps 206a, 206b, can be adjusted, at least in part, by using a driving pressure of gas (Ar, He, N2, air, methane, oxygen, or any other gas or mixture of gases). In an embodiment, the vacuum pressure, particularly that upstream of the respective vacuum pumps 206a, 206b, can be adjusted, at least in part, by varying the level of vacuum pulled by a given vacuum pump 206a, 206b. By adjusting the driving pressure independently on each channel, the proportion of ablated material coming from the ablation chamber to each detector can be tuned. In an embodiment, the vacuum ejectors (e.g., vacuum pumps 206a, 206b) can be driven independently by two separate mass flow controllers (e.g., MFC1 212 and MFC2 214) to allow, for example, the flow to be split unequally. The gas flow can be made up to an analytical flow rate of a given sample transport gas using the nebulizer/make up gas flow (e.g., make-up Ar input 204a, 204b) from the detector. The portion of the gas flow from the sample chamber input 202 arriving at a given vacuum pump 206a, 206b can be combined with a desired amount of make-up gas thereat to yield a corresponding outgoing made-up sample transport gas for delivery via a given output flow 208a, 208b.

Figure 3:
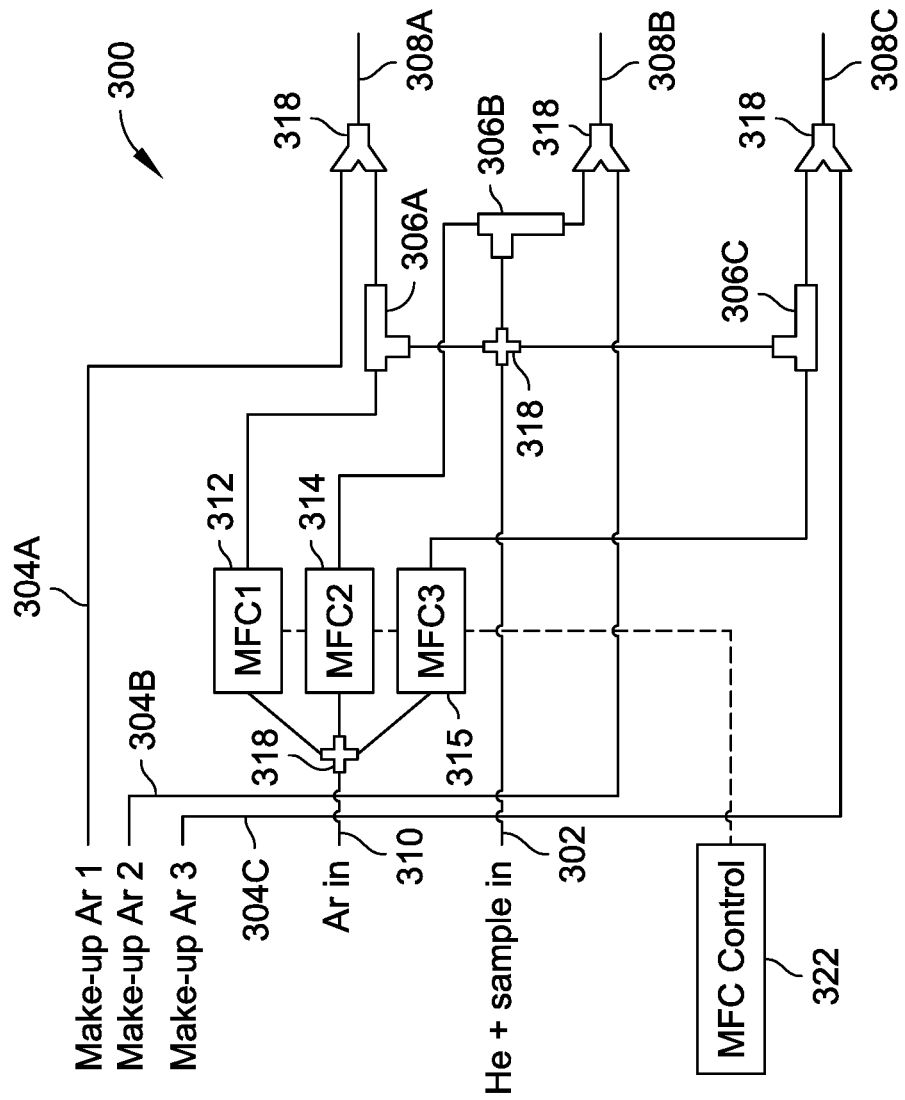
FIG. 3 is a schematic view of a laser-ablation-based analytical system, including a device using vacuum ejectors independently driven by three respective mass flow controllers (MFCs) to split the sample chamber gas flow to be delivered to three detector devices, according to an example embodiment of the present disclosure.

FIG. 3 illustrates a laser-ablation-based analytical system 300, according to an example embodiment of the present disclosure. The laser-ablation-based analytical system 300 can include a sample chamber input 302, three make-up argon (Ar) inputs 304a-304c, three vacuum pumps 306a-306c (e.g., in the form of vacuum ejectors), three output flows 308a-308c for analysis (e.g., analysis by a detection system (not shown) such as ICP-OES/ICP-MS), a primary Ar input 310 (e.g., from an Ar cylinder source), a first mass flow controller (MFC1) 312, a second mass flow controller (MFC2) 314, a third mass flow controller (MFC3) 315, a plurality of three-way connectors 318 (e.g., acting as a flow splitter or a flow consolidator, depending on orientation), and a control system (e.g., a MFC control 322), along with a plurality of fluid interconnections, as needed (not labelled). The laser-ablation-based analytical system 300 is similar to the laser-ablation-based analytical system 200, except that it has been expanded to facilitate the splitting of sample chamber gas flow from the sample chamber input 302 to be directed to three output flows 308a-308c. Thus, similarly constructed and functioning parts in systems 200, 300 are similarly numbered. It is noted that the flow splitters respectively leading to MFC1 312, MFC2 314, and MFC3 315 and to the three vacuum pumps 306a-306c can be 4-way connectors 318' with an input split into three output flows, as needed ultimately to facilitate the creation of three output flows 308a-308c of a respective made-up sample transport gas. With further respect to the laser-ablation-based analytical system 300 shown in FIG. 3, the vacuum pumps 306a-306c (e.g., ejectors) can be driven independently by three separate mass flow controllers (e.g., MFC1 312, MFC2 314, and MFC3 315) to allow the primary Ar flow to be split as desired (i.e., tuned), whether equally or unequally. The gas flow (e.g., for the output flows 308a-308c) can be made up to an analytical flow rate using the nebuliser/make up gas flow from the detector (e.g., via the make-up Ar inputs 304a-304c).

While the examples for FIGS. 2 and 3 illustrate scenarios for splitting the sample chamber gas flow into two or three streams or output flows for detection, it is to be understood that the present concept may be readily extended to situations where four or more output flows for detection are produced. Further, similarly functioning components shown in FIGS. 2 and 3 may be interchanged, if desired (e.g., two or more different pump types being employed in a single system). In FIGS. 1-3, similarly numbered parts from each series 100-300 (e.g., sample chamber input 102, 202, 302) can be expected to be of similar construction and function, unless otherwise expressly stated herein. Additionally, while He and Ar are disclosed as example carrier gases with respect to the embodiments of FIGS. 1-3, it is to be understood that other carrier gases (e.g., nitrogen, other noble gases) may be employed in some embodiments (e.g., for the primary added gas and/or the make-up gas). Such scenarios are considered within the scope of the present disclosure.

The laser-ablation-based analytical systems 100-300 may be controlled by a computing system, of which the MFC controller 222 can be a part, having a processor configured to execute computer readable program instructions (i.e., the control logic) from a non-transitory carrier medium (e.g., storage medium such as a flash drive, hard disk drive, solid-state disk drive, SD card, optical disk, or the like). The computing system can be connected to various components of the analytic system, either by direct connection, or through one or more network connections (e.g., local area networking (LAN), wireless area networking (WAN or WLAN), one or more hub connections (e.g., USB hubs), and so forth). For example, the computing system can be communicatively coupled (e.g., hard-wired or wirelessly) to the controllable elements (e.g., controllable valves, vacuum pumps, and/or mass flow controllers) of any of the given laser-ablation-based analytical systems shown in FIGS. 2 and 3. The program instructions, when executing by the processor, can cause the computing system to control the given laser-ablation-based analytical system. In an implementation, the program instructions form at least a portion of software programs for execution by the processor.

The processor provides processing functionality for the computing system and may include any number of processors, micro-controllers, or other processing systems, and resident or external memory for storing data and other information accessed or generated by the computing system. The processor is not limited by the materials from which it is formed or the processing mechanisms employed therein and, as such, may be implemented via semiconductor(s) and/or transistors (e.g., electronic integrated circuits (ICs)), and so forth.

The non-transitory carrier medium is an example of device-readable storage media that provides storage functionality to store various data associated with the operation of the computing system, such as a software program, code segments, or program instructions, or other data to instruct the processor and other elements of the computing system to perform the techniques described herein. The carrier medium may be integral with the processor, stand-alone memory, or a combination of both. The carrier medium may include, for example, removable and non-removable memory elements such as RAM, ROM, Flash (e.g., SD Card, mini-SD card, micro-SD Card), magnetic, optical, USB memory devices, and so forth. In embodiments of the computing system, the carrier medium may include removable ICC (Integrated Circuit Card) memory such as provided by SIM (Subscriber Identity Module) cards, USIM (Universal Subscriber Identity Module) cards, UICC (Universal Integrated Circuit Cards), and so on.

The computing system can include one or more displays to display information to a user of the computing system. In embodiments, the display may comprise a CRT (Cathode Ray Tube) display, an LED (Light Emitting Diode) display, an OLED (Organic LED) display, an LCD (Liquid Crystal Diode) display, a TFT (Thin Film Transistor) LCD display, an LEP (Light Emitting Polymer), or PLED (Polymer Light Emitting Diode) display, and so forth, configured to display text and/or graphical information such as a graphical user interface. The display may be backlit via a backlight such that it may be viewed in the dark or other low-light environments. The display may be provided with a touch screen to receive input (e.g., data, commands, etc.) from a user. For example, a user may operate the computing system by touching the touch screen and/or by performing gestures on the touch screen. In some embodiments, the touch screen may be a capacitive touch screen, a resistive touch screen, an infrared touch screen, combinations thereof, and the like. The computing system may further include one or more input/output (I/O) devices (e.g., a keypad, buttons, a wireless input device, a thumbwheel input device, a trackstick input device, and so on). The I/O devices may include one or more audio I/O devices, such as a microphone, speakers, and so on.

The computing system may also include a communication module representative of communication functionality to permit computing device to send/receive data between different devices (e.g., components/peripherals) and/or over the one or more networks. The communication module may be representative of a variety of communication components and functionality including, but not necessarily limited to: a browser; a transmitter and/or receiver; data ports; software interfaces and drivers; networking interfaces; data processing components; and so forth.

The one or more networks are representative of a variety of different communication pathways and network connections which may be employed, individually or in combinations, to communicate among the components of the given laser-ablation-based analytical system. Thus, the one or more networks may be representative of communication pathways achieved using a single network or multiple networks. Further, the one or more networks are representative of a variety of different types of networks and connections that are contemplated including, but not necessarily limited to: the Internet; an intranet; a Personal Area Network (PAN); a Local Area Network (LAN) (e.g., Ethernet); a Wide Area Network (WAN); a satellite network; a cellular network; a mobile data network; wired and/or wireless connections; and so forth. Examples of wireless networks include but are not necessarily limited to: networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. Wired communications are also contemplated such as through Universal Serial Bus (USB), Ethernet, serial connections, and so forth.

The computing system is described as including a user interface, which is storable in memory (e.g., the carrier medium) and executable by the processor. The user interface is representative of functionality to control the display of information and data to the user of the computing system via the display. In some implementations, the display may not be integrated into the computing system and may instead be connected externally using universal serial bus (USB), Ethernet, serial connections, and so forth. The user interface may provide functionality to allow the user to interact with one or more applications of the computing system by providing inputs (e.g., sample identities, desired dilution factors, standard identities, eluent identities/locations, fluid addition flow rates, etc.) via the touch screen and/or the I/O devices. For example, the user interface may cause an application programming interface (API) to be generated to expose functionality to an online dilution control module to configure the application for display by the display or in combination with another display. In embodiments, the API may further expose functionality to configure an inline dilution control module to allow the user to interact with an application by providing inputs via the touch screen and/or the I/O devices to provide desired dilution factors for analysis.

In implementations, the user interface may include a browser (e.g., for implementing functionality of the inline dilution control module). The browser enables the computing device to display and interact with content such as a webpage within the World Wide Web, a webpage provided by a web server in a private network, and so forth. The browser may be configured in a variety of ways. For example, the browser may be configured as an inline dilution control module accessed by the user interface. The browser may be a web browser suitable for use by a full resource device with substantial memory and processor resources (e.g., a smart phone, a personal digital assistant (PDA), etc.).

Generally, any of the functions described herein can be implemented using software, firmware, hardware (e.g., fixed logic circuitry), manual processing, or a combination of these implementations. The terms "module" and "functionality" as used herein generally represent software, firmware, hardware, or a combination thereof. The communication between modules in the given laser-ablation-based analytical system, for example, can be wired, wireless, or some combination thereof. In the case of a software implementation, for instance, a module may represent executable instructions that perform specified tasks when executed on a processor, such as the processor described herein. The program code can be stored in one or more device-readable storage media, an example of which is the non-transitory carrier medium associated with the computing system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A laser-ablation-based analytical system, comprising:
   a sample chamber input configured to deliver a sample chamber gas flow comprised of combination of a laser-ablated sample and a sample-carrier gas from a sample chamber;
   at least one make-up gas input configured to provide an amount of make-up gas to supplement the combination of the laser-ablated sample and the sample-carrier gas;
   a flow splitter connected to the sample chamber input, the flow splitter configured to split the sample chamber gas flow into a plurality of secondary sample chamber gas flows;
   a plurality of vacuum pumps fluidly connected to the sample chamber input via the flow splitter, each vacuum pump configured to receive a corresponding secondary sample chamber gas flow from the flow splitter, each vacuum pump configured to create a negative pressure in a sample chamber gas flow downstream of the sample chamber input and upstream of each vacuum pump, each vacuum pump configured to mix the make-up gas and the combination of the laser-ablated sample and the sample-carrier gas to yield a made-up sample transport gas;
   a plurality of distinct output flows respectively fluidly connected with a corresponding vacuum pump, each distinct output flow further fluidly coupled with a corresponding make-up gas input, a given output flow configured to mix the make-up gas and the combination of the laser-ablated sample and the sample-carrier gas received from a corresponding vacuum pump to yield a given made-up sample transport gas; and
   a plurality of detection devices with a given output flow configured to deliver the given made-up sample transport gas to a distinct corresponding detection device for analysis of the laser-ablated sample.

2. The laser-ablation-based analytical system of claim 1, further comprising a plurality of mass flow controllers, a respective mass flow controller fluidly connected with a corresponding vacuum pump.

3. The laser-ablation-based analytical system of claim 2, wherein a given mass flow controller is configured to regulate an amount of the sample chamber gas flow that is permitted to flow toward a corresponding vacuum pump.

4. The laser-ablation-based analytical system of claim 1, wherein a corresponding vacuum pump comprises a vacuum ejector.

5. The laser-ablation-based analytical system of claim 1, wherein the sample chamber gas flow arriving at a corresponding vacuum pump is an amount insufficient for analysis, an amount of the make-up gas input to be mixed with the sample chamber gas flow chosen to yield an amount of the made-up sample transport gas necessary for analysis.

6. The laser-ablation-based analytical system of claim 1, wherein a corresponding vacuum pump is configured to generate a negative pressure upstream thereof.

7. The laser-ablation-based analytical system of claim 1, wherein the make-up gas is comprised of argon.

8. A laser-ablation-based analytical system, comprising:
a sample chamber input configured to deliver a sample chamber gas flow comprised of combination of a laser-ablated sample and a sample-carrier gas from a sample chamber;
a carrier gas input configured to provide an amount of a carrier gas to supplement the combination of the laser-ablated sample and the sample-carrier gas;
a plurality of vacuum pumps fluidly connected to the sample chamber input and the carrier gas input, each vacuum pump configured to suction the sample chamber gas flow toward the vacuum pump, each vacuum pump configured to mix the carrier gas and the combination of the laser-ablated sample and the sample-carrier gas to yield a sample transport gas;
a plurality of distinct output flows respectively fluidly connected with a corresponding vacuum pump; and
a plurality of detection devices with a given output flow configured to deliver a given portion of the sample transport gas from the vacuum pump to a distinct corresponding detection device for analysis of the laser-ablated sample.

9. The laser-ablation-based analytical system of claim 8, comprising at least one flow splitter, the at least one flow splitter configured to split the sample chamber gas flow to the plurality of vacuum pumps.

10. The laser-ablation-based analytical system of claim 9, further comprising a plurality of mass flow controllers, a respective mass flow controller fluidly connected with a corresponding vacuum pump.

11. The laser-ablation-based analytical system of claim 10, wherein a given mass flow controller is configured to regulate an amount of the sample chamber gas flow that is permitted to flow toward a corresponding vacuum pump.

12. The laser-ablation-based analytical system of claim 8, wherein each vacuum pump comprises a vacuum ejector.

13. The laser-ablation-based analytical system of claim 8, wherein the sample chamber gas flow arriving at a given vacuum pump is an amount insufficient for analysis, an amount of the carrier gas to be mixed with the sample chamber gas flow chosen to yield an amount of the sample transport gas necessary for analysis.

14. The laser-ablation-based analytical system of claim 8, wherein the sample chamber gas flow arriving at a given vacuum pump is an amount insufficient for analysis, the carrier gas including a first carrier gas and a second carrier gas, the first carrier gas mixed with the sample chamber gas flow at the given vacuum pump, the second carrier gas added to the sample chamber gas flow after the given vacuum pump, the second carrier gas making up the sample chamber gas flow to a flow level needed for analysis at the corresponding detection device.

15. The laser-ablation-based analytical system of claim 8, wherein the carrier gas is comprised of argon.

16. A laser-ablation-based analytical system, comprising:
a sample chamber input configured to provide a sample chamber gas flow comprised of a laser-ablated sample and a sample-carrier gas;
a plurality of vacuum pumps fluidly connected to the sample chamber input, a given vacuum pump configured to draw an amount of the sample chamber gas flow toward the given vacuum pump;
at least one make-up gas input configured to provide an amount of make-up gas to be added to the sample chamber gas flow to yield a made-up sample transport gas;
a plurality of detection devices; and
a plurality of distinct output flows configured to deliver a corresponding amount of the made-up sample transport gas from a respective vacuum pump to a distinct corresponding detection device for analysis of the laser-ablated sample.

17. The laser-ablation-based analytical system of claim 16, wherein the make-up gas input is introduced to the chamber gas flow either one of at a given vacuum pump or after the given vacuum pump.

* * * * *